United States Patent [19]

Carlson

[11] Patent Number: 5,073,862
[45] Date of Patent: Dec. 17, 1991

[54] METHOD AND APPARATUS FOR DIAGNOSING PROBLEMS WITH THE THERMODYNAMIC PERFORMANCE OF A HEAT ENGINE

[76] Inventor: Peter J. Carlson, 8604 Battom Ct., Raleigh, N.C. 27612

[21] Appl. No.: 430,072

[22] Filed: Oct. 31, 1989

Related U.S. Application Data

[63] Continuation of Ser. No. 89,514, Aug. 26, 1987, abandoned.

[51] Int. Cl.[5] .................... G06F 15/20; G01M 15/00
[52] U.S. Cl. ............................ 364/551.01; 364/505; 364/493; 340/648; 324/511
[58] Field of Search ............... 364/492, 493, 494, 550, 364/551.01, 552, 505; 340/640, 648; 324/511, 537

[56] References Cited

U.S. PATENT DOCUMENTS

| | | | |
|---|---|---|---|
| 4,205,381 | 5/1980 | Games et al. | 364/505 |
| 4,531,193 | 7/1985 | Yasuhara et al. | 364/551 |
| 4,685,072 | 8/1987 | Johnson et al. | 364/551 |
| 4,707,796 | 11/1987 | Calabro et al. | 364/551 |
| 4,748,573 | 5/1988 | Sarandrea et al. | 364/551.01 |
| 4,787,053 | 11/1988 | Moore | 364/551.01 |
| 4,788,647 | 11/1988 | McManus et al. | 364/492 |
| 4,839,830 | 6/1989 | Amey et al. | 364/551.01 |
| 4,843,575 | 6/1989 | Crane | 364/551.01 |
| 4,849,894 | 7/1989 | Probst | 364/551.01 |

Primary Examiner—Parshotam S. Lall
Assistant Examiner—Brian M. Mattson
Attorney, Agent, or Firm—Rhodes, Coats & Bennett

[57] ABSTRACT

A method and apparatus measured and calculates the derived thermodynamic state of a heat-pump or air conditioning system using information from transducers sensing elementary thermodynamic variables in the system. Elementary signals such as pressure, temperature, power, humidity, air flow, and others as required are derived using transducers from closed and open portions of the thermodynamic system, and which signals are then transmitted using appropriate transmission media. These signals are input to a computer, which could take many forms (electrical analog, electrical digital, pneumatic, hydraulic, and others), and these signal inputs along with known and tabulated thermodynamic characteristics of the working fluid (refrigerant) and psychrometric properties of the cooled media (air for example), are used to calculate thermodynamic output variables such as entropy, enthalpy, pressure, temperature, and volume at various states in the thermodynamic cycle. The output variables can be presented in tabulated or graphic form for clear understanding such as pressure vs. volume, temperature vs. entropy, or pressure vs. enthalpy graphs of the working system. The derived data can be used to determine efficiency and operating condition of the heat-pump or air-conditioning system and can be used as an aid in the diagnosis of the cause of a malfunctioning or inefficient system. Using artificial intelligence in an "expert" system, diagnosis could be completely automated.

14 Claims, 4 Drawing Sheets

CONDENSER LOCALIZE DATA

METHOD AND APPARATUS FOR DIAGNOSING PROBLEMS WITH THE THERMODYNAMIC PERFORMANCE OF A HEAT ENGINE

This is a continuation of application Ser. No. 089,514, filed Aug. 26, 1987, now abandoned.

BACKGROUND OF THE INVENTION

Heat pumps and air conditioners are thermodynamic systems generically referred to as heat engines. These heat engines oppose the normal flow of heat from a warm to a cold body by an input of energy (work). They can provide considerably higher energy efficiency for comfort heating in residential and commercial structures than primary energy heating. However, the second law of thermodynamics provides that no heat engine can be 100% efficient, and this is reflected by losses in the system. These losses, among others, consist of mechanical friction losses, and losses due to the non-ideal nature of the working fluid (refrigerant). These losses can be minimized, and therefore efficiency improved (a measure of efficiency called Coefficient Of Performance (COP) is used in the Heating Ventilating and Air Conditioning (HVAC) industry) by operating the non-ideal refrigerant at optimum conditions.

The presence of contaminants, such as air or moisture, can cause the COP to be severely degraded. Too little or too much refrigerant in the system can also cause the COP to be degraded. A lack of adequate insulation around the vapor line can cause the COP to be degraded, particularly in the heat pump winter heating cycle. Malfunctions in the system, such as a stuck expansion valve or partially blocked capillary expansion tube, can cause the COP to be adversely affected. It is the estimate of an industry expert that 50% of all HVAC systems installed are operating considerably below optimum.

It is the service technician's job to determine what problem may be causing a malfunction or performance degradation. Further, because heat pumps used in forced warm-air heating systems may not provide air which is warm to the human touch, it is frequently the technician's goal to reassure the disgruntled first time heat pump owner that all is well (if it truly is).

However, it is industry experience that large personnel turnover, lack of adequate diagnostic tools and/or difficulty in using available tools, and lack of training in thermodynamic principles many times precludes accurate diagnosis. This results in inefficient operation of HVAC systems in industrial, commercial, and residential applications.

The traditional service tools for the HVAC technician is a set of pressure gages used to measure high and low side system pressure, and temperature gages to measure indoor inlet, indoor outlet, and outdoor temperatures. In addition, a well-equipped technician will have a (sling) hygrometer for measuring relative humidity. Readings obtained from these instruments, coupled with psychrometric tables and manufacturers' performance curves can provide a reasonably accurate system status.

It is rare, however, that all the instruments are available, and that the technician is sufficiently skilled to interpret the readings correctly. Most often, conclusions are drawn from pressure gage readings alone. But pressure gage readings alone can be very misleading. For instance, pressure gage readings can be reasonably normal, accounting for other variables such as humidity, indoor and outdoor temperatures, vapor line insulation, and air flow, and yet the system may be performing well below optimum because of air or moisture contamination (very common) of the refrigerant.

SUMMARY AND OBJECTS OF THE INVENTION

A plurality of thermodynamic system variables are transduced into electrical signals at a plurality of physical locations. At each location the analog signals are Time Domain Multiplexed (TDM) and changed to digital form in the analog to digital converter. The order can be reversed, digital conversion and then multiplexing could be used, still remaining within the scope of the present invention. The resulting digital signals are then multiplexed onto a communications channel (although time division multiplexing is contemplated, other multiplexing means could be employed consistent with the communications media, and within the scope of the present invention). A demultiplexer receives information via the communications channel, and this information is sent to the computer using conventional means. The computer will use this information to calculate output variables (COP), display information using graphic displays (real time pressure/enthalpy curves), provide expert diagnosis (air or water in the system, state of charge), and store detailed performance data in mass media (disk storage systems) for comparison with earlier or later performance data.

To allow faster and easier interaction with the HVAC system, the diagnostic system will be capable of remotely controlling the HVAC system to initiate different cycles, such as air conditioning or heat pump or compressor defrost. This is accomplished using a communications channel and multiplexing means from the computer to the plurality of physical locations. Also, this communication means can be employed to control action of service tools, such as a vacuum pump, and valves to control the addition or discharge of refrigerant from the system.

Accordingly, it is a primary object of the present invention to reduce the cost associated with the repair, replacement, maintenance, and operation of a HVAC system.

The foregoing object is achieved by improving the speed and accuracy obtainable in diagnosing inefficiencies and malfunctions in the HVAC system so that repairs and/or replacement of defective components can be effected in the most efficient way.

It is a further object of the present invention to provide an expert diagnostic system which processes data obtained from the HVAC system and provides diagnostic information to the technician or repairman and means for recording the state of the system.

It is yet another object of the present invention to provide diagnostic information to allow optimization of controllable thermodynamic system variables.

Other objects and advantages of the present invention will become apparent and obvious from a study of the following description and the accompanying drawings which are merely illustrative of such invention.

DETAILED DESCRIPTION OF THE INVENTION

Figure 1:
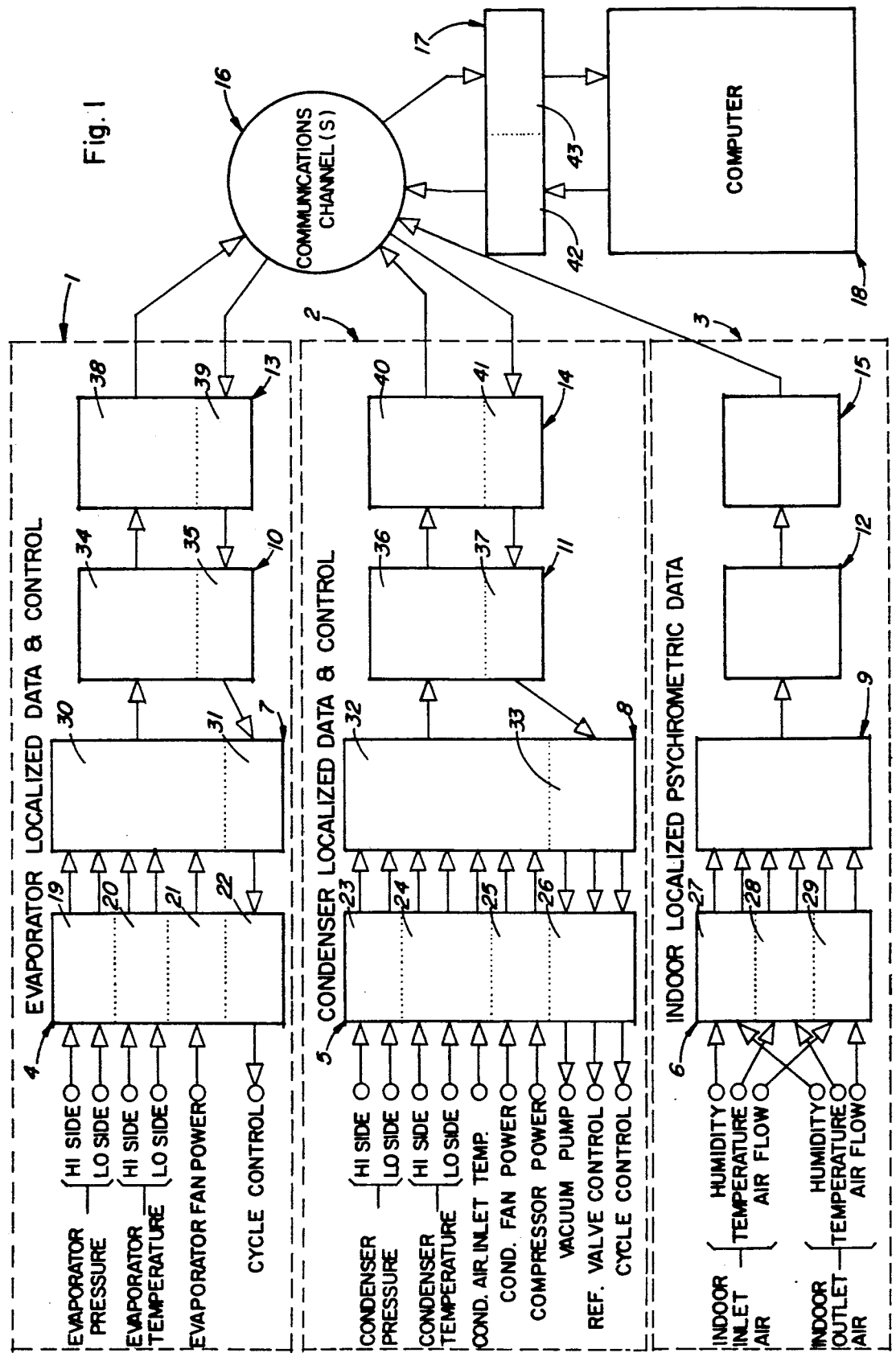
FIG. 1 is a block diagram of the diagnostic system of the present invention.

Referring to FIG. 1, system variables are measured and transduced into electrical signals at separate physical locations: the evaporator 1, the condenser 2, and the indoor controlled environment 3. This could be accomplished either by temporarily installing sensors into the HVAC system, or in the case of large industrial systems, by tapping into existing transducer signals. While most variables are readily available, some may not be, such as pressure signals 19, at the evaporator 1. The computer 18 can act as an expert or intelligent system, recognize the lack of complete data, and diagnose the HVAC machine function based on the best available information. However, the computer 18 could also act in a traditional role (nonexpert and/or non-intelligent) for providing means for digesting information, computing output variables, and displaying information in graphic or tabulated format and remain within the scope of the present invention.

FIG. 1 shows three physically separate information channels 1, 2, and 3 corresponding to the three separate physical locations. In many applications, such as split-system heat pump/air conditioning, this is the case. In other applications, such as automotive air conditioning, only a small physical separation exists between the sources of information from the physical variables, the control actuators, and the computing system. Without prejudice, the means for communication, whether it be by wire, optical, or other means, in baseband or modulated communications, and using a single or plurality of information channels, is within the scope of this invention. Thus, the information derived at 1, 2 and 3 could be transduced and conditioned in a single element or plurality of elements (as shown in FIG. 1), communicated to the computer using a single communications channel (as shown in FIG. 1) or plurality of communications channels and remain within the scope of the present invention.

In the preferred embodiment of FIG. 1, the physical variables, such as pressure, temperature, voltage, current, humidity and air flow, are converted into electrical signals suitable for conditioning and multiplexing at each of the three locations as described below.

Evaporator Localized Data and Control. The evaporator localized data and control section of the diagnostic system, shown as numeral 1, contains a means for gathering data at the evaporator which is used to evaluate system performance. The evaporator localized data and control equipment is located at or near the site of the evaporator of the heat pump.

Pressure transducer 19 measures the refrigerant fluid pressure entering the evaporator ("HIGHSIDE") and exiting the evaporator ("LOWSIDE"). The pressure transducer used can be of the semiconductor strain gauge type since these are well adapted to most refrigerants, have the required sensitivity and accuracy, and can be compensated for wide temperature variations. Shrader valves and other test valves, permanently installed in HVAC systems, provide means for temporarily connecting the pressure transducers. At least two of these access valves are commonly installed in the liquid and vapor lines, but more may be installed in a larger system.

Temperature transducers 20 are located at the inlet and outlet of the evaporator to sense the refrigerant temperature at these points. The temperature transducers including thermistors, semiconductor transducers (band gap reference types), thermocouples, Resistance Temperature Transducers (RTD), and other types can be applied using insulated cuffs which isolate the transducer from external thermal conditions. The cuffs can be attached around piping at points where it is desirable to measure the temperature of the refrigerant by using temporary fasteners (one means might be VELCRO hook and loop fasteners) to secure the cuffs. Because the piping is almost always copper or possibly aluminum with excellent thermal conductivity, the temperature of the surface of the piping very closely approximates that of the refrigerant if adequate means are provided to insulate the pipe and transducer from the external environment.

Voltage and current transducers 21 located at the evaporator fan are used to obtain input power to the evaporator fan. The current transducers are of the clamp-on type which measures the magnetic field surrounding the conductor. The AC voltage is measured using a step-down transformer to isolate and protect the technician.

The electrical signals produced by transducers 19, 20, and 21 are transmitted to the signal conditioning and analog multiplex section 30. The signal conditioning section 30 changes the raw electrical signals from the transducers into electrical analogs appropriate for input into the analog multiplexer. As an example of signal conditioning, the AC current signal may be conditioned to be represented by a DC signal proportional to the RMS value of the AC current. The AC voltage signal may be conditioned in a like manner. An additional DC signal representing power factor or phase angle between voltage and current may be included to preserve useful information about reactive and useful power. After conditioning, the electrical analog signals are then analog mutiplexed by multiplexer 30 to multiplex the signals such that a single analog to digital converter can be used at that location. This is not an essential part of the invention, but is dictated by functional consideration. That is, multiple analog to digital converters could be used with the multiplexing being performed on the resulting digital signals.

After conversion to digital signals, Time Domain Multiplexer 38 transmits the conditioned and multiplexed information by one or more communications channels 16 as will be hereinafter described.

Condenser Localized Data. The condenser localized data and control section of the diagnostic system, indicated generally at 2, obtains means for obtaining data at the condenser to evaluate system performance. The condenser localized data and control equipment is located at or near the condenser and is similar in many respects to the evaporator data and control equipment.

Pressure transducers 23 and temperature transducers 24 measure the refrigerant pressures and temperatures, respectfully, entering the condenser ("HIGHSIDE") and exiting the condenser ("LOWSIDE"). As with the evaporator localized data and control equipment, the pressure transducers 23 used may be of the semiconductor strain gauge type and are coupled to Shrader valves in the HVAC system. The temperature transducers 24, which may be thermistors, band gap reference type semiconductor transducers, thermocouples, or RTD'S are attached to the piping by insulated cuffs as already described. Voltage and current transducers 25 are used to obtain the input power to the compresser fan motor and compressor motor.

The raw electrical signals produced by transducers 23, 24, and 25 are transmitted to the signal conditioner and analog multiplexer 32. Signal conditioner 32 changes the raw electrical signal produced by the transducers into an analog signal suitable for multiplexing. The conditioned signals are then analog multiplexed at 32 and transmitted to the analog to digital converter 36. After being digitized, the electrical signals are transmitted to Time Domain Multiplex 40 which then transmits them to at least one communication channel 16.

Indoor Localized Psychometric Data and Control. The indoor localized psychometric data segment of the diagnostic system is indicated generally at 3. This section senses ambient conditions at the air duct inlets and outlets which communicate air to and from the interior space. Indoor localized psychometric data unit 3 contains means for sensing the humidity, temperature, and air flow into and out of these air ducts.

Humidity transducers 27 sense the humidity of the air entering the indoor space (indoor inlet air) and the air leaving the indoor space (indoor outlet air). Humidity transducers 27 can be of the semiconducting type wherein complex impedance and conductivity varies as a function of relative humidity, or of the hygroscopic polymer capacitive type wherein electrical capacitance varies as a function of humidity. Temperature transducers 28 sense the temperature of the indoor inlet air and indoor outlet air, and further changes the sensed information into raw electrical signals. A variety of temperature sensors can be used, including thermocouples, thermistors, or semiconductor types.

Air flow transducers 29 also measure the air flow at the air inlet and air outlet. Most commercially available transducers come within the accuracy requirements for HVAC diagnostic systems.

Transducers 27, 28, and 29 convert the sensed electrometric data into raw electrical signals which are then transmitted to signal conditioner and analog multiplexer indicated at 9. This step conditions the raw signals into electrical analog signals, which are analog multiplexed and then sent to the analog to digital converter 12. Next, the digitized signals are Time Domain Multiplexed at 15 before they are sent from the indoor localized psychometric data and control segment via communication channels 16.

The final step in each localized data segment 1, 2, and 3 of the diagnostic system is the Time Domain Multiplexing of the electrical signal produced. Other multiplexing means, however, could also be used, such as Frequency Domain Multiplexing. Regardless of the form used, the multiplexed electrical signals produced by each localized data and control segment are transmitted over one or more communication channels 16 to the computer 18. In the preferred embodiment, a radio means is used as communication channel 16. Baseband or narrowband modulation may be used as appropriate for the transmission media, and the signals are transmitted using Binary Phase Shift Key (BPSK) modulation of a subcarrier, which signal is used to modulate a radio frequency carrier for wireless transmission.

The information transmitted by communication channel 16 is received and demultiplexed by Time Domain Demultiplexer 43. Time Domain Demultiplexer 43 then transmits the resulting digital electrical signal to computer 18.

Computer 18 receives and analyzes the data produced by each localized data and control segment 1, 2, and 3 to generate diagnostic information for an operator or service technician. Computer 18 provides useful computed numeric information, such as the coefficient of performance, input power, and output cooling or heating rate of the heat engine being tested.

Figure 3:
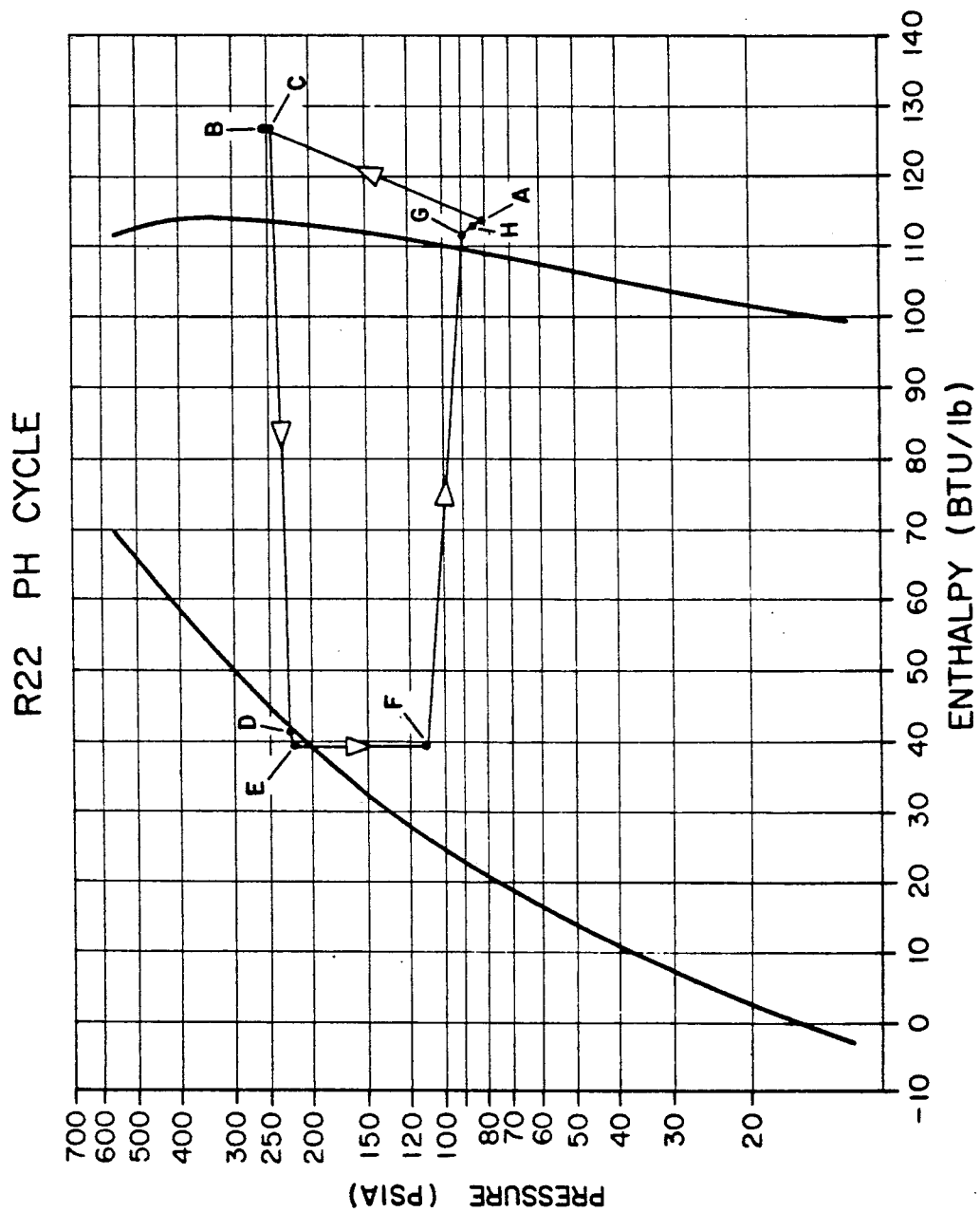
FIG. 3 is a graph illustrative of the type of output obtained therefrom.
Figure 4:
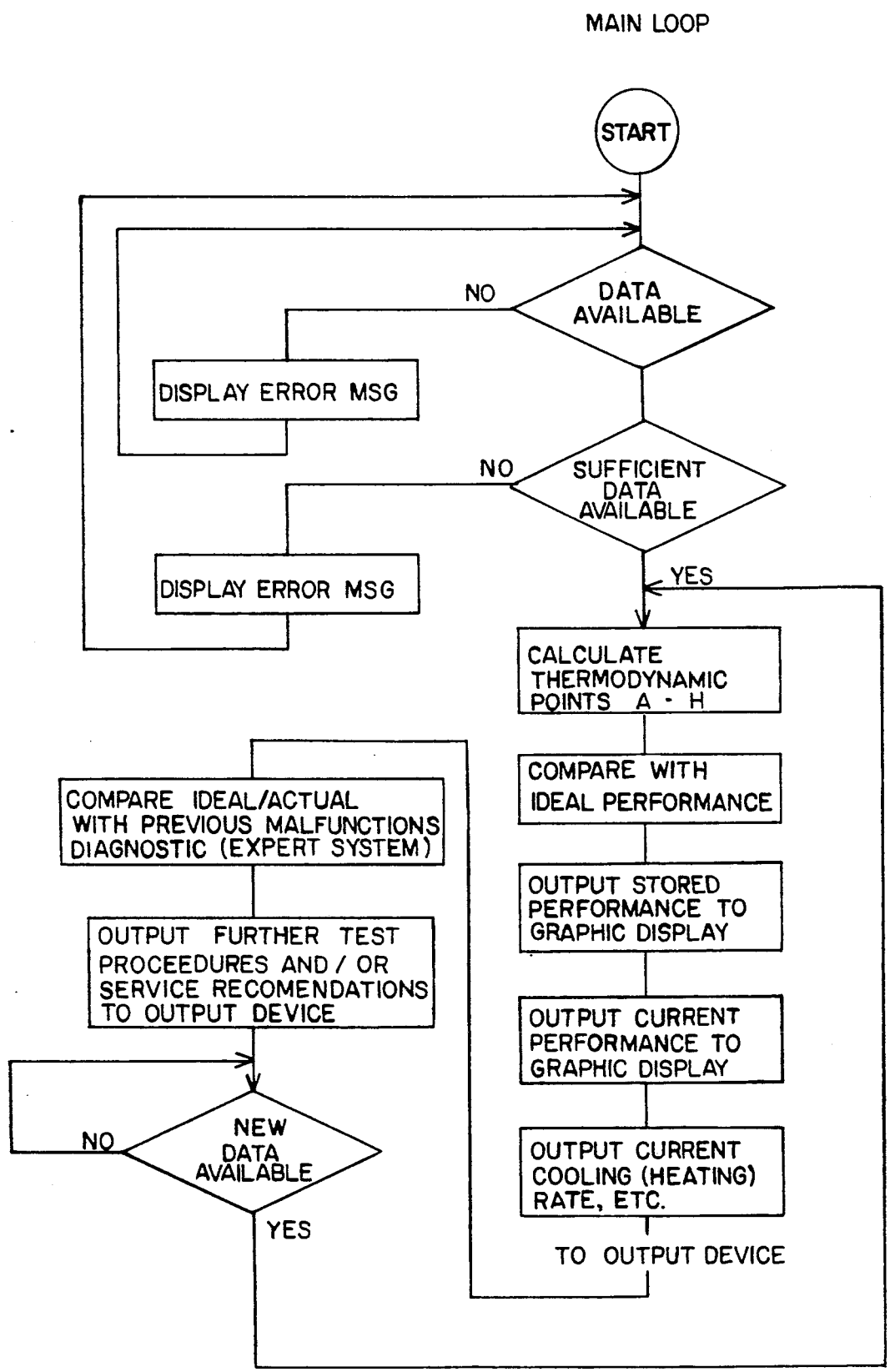
FIG. 4 is a flow diagram of the operation of the diagnostic apparatus.

This information, along with the sensed physical variable values, is then displayed to an operator. Furthermore, the computer may also generate a graphic output depicting the thermodynamic performance of the heat engine system, one example being the pressure-enthalpy diagram shown in FIG. 3. Given input variables such as inlet air temperature and humidity, outdoor air temperature and humidity, and previous performance or manufacturers data, the theoretical PH cycle beginning with A through H and back to A can be predicted. As an example of diagnostic capability, an overlay of the actual operating cycle can provide immediate graphic analysis comparing present operating cycles relative to past performance or data supplied by the manufacturer. The following explanation is given for a conditioned space cooling cycle; a similar explanation could be given for a conditioned space heating cycle. For reference, point 0 represents input enthalpy (H) and pressure (P) at the input to the compressor. Point B is P and H at the output of the compressor representing a constant entropy compression. The pressure loss from points B to C is loss in the compressor valves. The line from point C to D represents pressure loss and release of latent heat from the thermodynamic fluid in the condenser. The pressure loss and release of latent heat represented by the curve from point D to E represents fluid transport in the liquid line. Through the expansion valve or capillary tube the working fluid undergoes a pressure loss from points E to F. From points F to G, the thermodynamic fluid undergoes a pressure loss and absorbs heat in the evaporator. Additional heat (superheat) is absorbed from the conditioned space, and an additional pressure loss is observed in the transition from point G to point H in the vapor line within the conditioned space. From point H to point A, additional heat (further superheat) is absorbed in the vapor line outside the conditioned space. As an example of diagnostic output, the ratio of specific enthalpy input from points A to B to the refrigerating effect represented by the specific enthalpy difference from points E to H is the Coefficient Of Performance (COP). Other output variables can be derived from points on the PH diagram along with other input variables such as input power to the compressor.

Communication channels 16 are also capable of transmitting information from computer 18 to the evaporator or localized data and control section 1 and condenser localized data and control section 2. Digital signals produced by computer 18 are Time Domain Multiplexed at 42 before being sent onto communication channels 16.

Time Domain Demultiplexer 39 receives the information sent over communication channel 16 by computer 18. Time Domain Demultiplexer 39 is located at the site of the evaporator within evaporator localized data and control section 1. After demultiplexing at 39, the received signal passes to the digital to control converter 35 where it is changed into a control signal. Control demultiplexer 7 then alters the signal into a form suitable for control actuator 22, which can change the systems cycle (i.e. cooling, heating, fan only).

Time Domain Demultiplexer 41, part of the condenser localized data and control segment 2, receives the information sent to it by computer 18 via communication channels 16. Digital to control converter 37 returns the signal to an analog form which is then sent to control demultiplexer 33. The electrical analog signal thus produced is received by control actuators 26 which can directly operate service tools (vacuum pump and refrigerant valve) and cause cycle changes such as operation of the defrost system.

The foregoing communication paths leading back from the computer to control actuators at the heat pump provides a means by which the operator or expert computer system can directly vary system performance. This function aids in diagnosis and can also be used to automatically improve system operating performance. In the diagnosis function, an operator or expert computer system can provide a stimulus to vary the operating conditions so that the resulting output variables at the physical locations may be measured to indicate changes in performance. This capacity of the diagnostic system greatly improves the speed and accuracy with which it analyzes HVAC system performance.

Computer 18 can also perform an expert diagnostic function. By storing past performance and earlier test and manufacture performance data as a data base, computer 18 can provide expert performance evaluation of the HVAC system, recommend service procedures, and recommend means for improving the performance. An expert system could isolate problems by means of a trouble-shooting tree, following the same logic that a human diagnostician might use. A relatively simple example might involve abnormally high pressure in the liquid line. In this case, possible problems range from inadequate air flow around the condenser, to obstructed capillary tubes at the evaporator, to high outdoor air temperatures (in the case of indoor cooling), to refrigerant contamination by non-condensable fluid (air). In the above example, high outdoor air temperatures will be recognized by the inlet air temperature transducer at the outdoor unit. An obstructed capillary tube will be diagnosed by observing simultaneous high liquid line pressure and low vapor line pressure. If these conditions are not observed, the expert system might ask that exhaust air temperature at the condensor be measured (using the same transducer as would be used for inlet air measurement), and if a large difference in inlet to exhaust temperature were observed, thereby concluding that there was inadequate air flow at the condensor. Finally, if none of the above conditions were met, the HVAC diagnostic system might conclude that a noncondensable fluid was contaminating the refrigerant.

Figure 2:
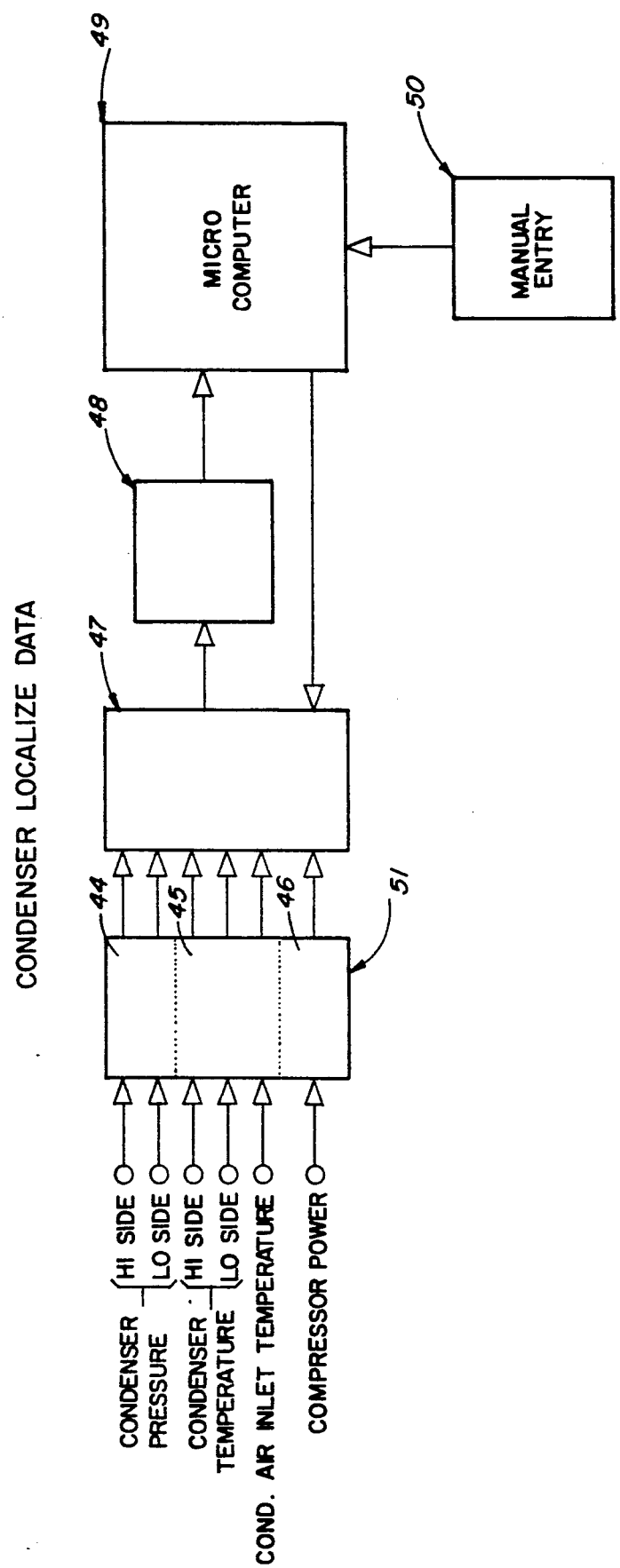
FIG. 2 is a block diagram of a second embodiment thereof.

A Simplified Diagnostic System. In FIG. 2 is shown a simplified version of the diagnostic system of FIG. 1. This embodiment of the present invention is intended to be highly portable. The embodiment shown here is intended for use where the extensive diagnostic capabilities of the embodiment of FIG. 1 are not required. Transducers 44, 45, and 46 convert physical variables to electrical analogs. An analog multiplexer 47 provides a TDM signal to the analog to digital converter 48. As with the embodiment of FIG. 1, this is not an essential part of the present invention, and a multiple of digital to analog converters could first be employed with digital multiplexing then providing the multiplex means, remaining within the scope of the present invention. A manual entry keypad 50 allows other variables to be entered such as indoor air temperature and humidity. The keypad also allows operator interaction to request output of diagnostic variables.

Given information on all system variables shown in FIG. 1, the present invention can provide extremely accurate system performance diagnosis, and indicate means for performance improvement. An essential part of the present invention is to utilize computer capabilities to diagnose malfunctions and suggest performance improvements. In addition, artificial intelligence and expert system capabilities can be used in diagnosing system malfunctions and projecting possible performance improvements even given incomplete information. Finally, the embodiment of the invention shown in FIG. 2 represents a minimum system which can be hand-held or portable, but can still provide the diagnostic and expert system capabilities of the system of FIG. 1, but with more data entered manually using a keypad or other input device.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. In the operation of a heat engine having an evaporator and a condenser, a method of diagnosing and evaluating actual thermodynamic performance of the heat engine comprising:
   a) sensing evaporator localized data and producing output signals corresponding to the sensed evaporator localized data;
   b) sensing condenser localized data and producing output signals corresponding to the sensed condenser localized data;
   c) sensing indoor psychrometric data in an environment controlled by the heat engine and producing output signals corresponding to the sensed psychrometric data;
   d) transmitting the output signals corresponding to the sensed evaporator localized data, condenser localized data, and psychrometric data to a processing means and calculating a performance data set indicative of the actual thermodynamic performance of the heat engine;
   e) storing a predefined performance data set in a memory device operatively connected to the processing means, the predefined performance data set being representative of a normal thermodynamic performance of the heat engine;
   f) comparing the calculated performance data set with the predefined performance data set stored in memory to yield a comparative result indicative of whether the heat engine is operating normally; and
   g) displaying the comparative result.

2. The diagnostic method according to claim 1 wherein the evaporator localized data includes refrigerant pressure and temperature entering or exiting the evaporator.

3. The diagnostic method according to claim 2 wherein the evaporator localized data further includes input power to the evaporator.

4. The diagnostic method according to claim 1 wherein the condenser localized data includes refrigerant pressure and temperature entering or exiting the condenser.

5. The diagnostic method according to claim 4 wherein the condenser localized data further includes input power to the condenser.

6. The diagnostic method according to claim 1 wherein the indoor psychrometric data includes air flow at an indoor inlet or outlet.

7. The diagnostic method according to claim 1 further comprising:
   a) storing a plurality of performance data sets indicative of different malfunctioning conditions in said memory device;
   b) relating each performance data set to a malfunction diagnosis;
   c) comparing the calculated performance data set with the predefined performance data sets representative of the different malfunctioning conditions; and
   d) if the calculated performance data set matches a predefined performance data set displaying the malfunction diagnosis corresponding to the predefined performance data set matching the calculated performance data set.

8. In the operation of a heat engine having an evaporator and a condenser, a method for diagnosing and evaluating actual thermodynamic performance of the heat engine, comprising:
   a) sensing evaporator localized data and producing output signals corresponding to the sensed evaporator localized data;
   b) sensing condenser localized data and producing output signals corresponding to the sensed condenser localized data;
   c) sensing indoor psychrometric data in the controlled environment and producing output signals corresponding to the sensed indoor psychrometric data.
   d) transmitting the output signals corresponding to the sensed evaporator localized data, condenser localized data and psychrometric data to a processing means located externally of the heat engine and calculating a performance data set indicative of actual thermodynamic performance of the heat engine; and
   e) displaying the calculated performance data set.

9. The diagnostic method according to claim 8 wherein said performance data set includes a coefficient of performance of the heat engine.

10. The diagnostic method according to claim 9 wherein the performance data set further includes total input power to the heat engine and output heating or cooling rate.

11. The diagnostic method according to claim 8 wherein the performance data set includes a pressure-/enthalpy diagram.

12. The diagnostic method according to claim 8 further including:
   a) controlling the operation of the heat engine in accordance with control signals originating with said processing means; and
   b) transmitting sensed data representative of actual thermodynamic performance of the heat engine to the processing means during the controlled operation of the heat engine by said processing means.

13. An apparatus for diagnosing problems with current thermodynamic performance of a heat engine including a condenser and an evaporator, comprising:
   a) means for sensing evaporator localized data and producing output signals corresponding to the sensed evaporator localized data;
   b) means for sensing localized data and producing output signals corresponding to the sensed condenser localized data;
   c) means for sensing indoor psychrometric data in a controlled environment and producing output signals corresponding to the sensed indoor psychrometric data;
   d) a memory means for storing a predefined performance data set which is representative of the thermodynamic performance of a normally functioning heat engine;
   e) a processing means operatively connected with each of said sensing means and said memory means for calculating a performance data set indicative of the current thermodynamic performance of the heat engine and comparing the calculated performance data set to said predefined performance data set stored in memory to yield a comparative result indicative of whether the engine is operating normally; and
   f) display means for displaying the comparative result.

14. The diagnostic apparatus according to claim 13 further including a memory means for storing a plurality of defined performance data sets indicative of different malfunctioning conditions of the heat engine and a malfunction diagnosis corresponding to each predefined performance data set; wherein said processing means includes means for comparing said calculated performance data set with said predefined performance data sets stored in memory; and means for displaying the malfunction diagnosis corresponding to the thermodynamic performance data set, if any, matching the calculated performance data set.

* * * * *